United States Patent
Spinger et al.

(10) Patent No.: US 11,506,356 B2
(45) Date of Patent: Nov. 22, 2022

(54) MICRO-OPTIC FOR MICRO-LED PROJECTION UNIT

(71) Applicant: Lumileds LLC, San Jose, CA (US)

(72) Inventors: Benno Spinger, Aachen (DE); Steffen Zozgornik, Leverkusen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/193,783

(22) Filed: Mar. 5, 2021

(65) Prior Publication Data
US 2021/0278055 A1 Sep. 9, 2021

(30) Foreign Application Priority Data
Mar. 5, 2020 (EP) .................................... 20161097

(51) Int. Cl.
| | |
|---|---|
| *F21S 41/00* | (2018.01) |
| *F21S 41/275* | (2018.01) |
| *G02B 27/10* | (2006.01) |
| *G02B 27/30* | (2006.01) |
| *F21Y 115/10* | (2016.01) |

(52) U.S. Cl.
CPC ........ *F21S 41/275* (2018.01); *G02B 27/1066* (2013.01); *G02B 27/30* (2013.01); *F21Y 2115/10* (2016.08)

(58) Field of Classification Search
CPC .... F21S 41/275; G02B 27/1066; G02B 27/30
See application file for complete search history.

(56) References Cited

U.S. PATENT DOCUMENTS

| | | | |
|---|---|---|---|
| 6,599,002 B2* | 7/2003 | Hsieh ........................ | F21V 5/04 362/555 |
| 10,408,390 B2* | 9/2019 | Minor ....................... | F21K 9/60 |
| 2003/0147055 A1* | 8/2003 | Yokoyama ......... | G03B 21/2033 353/98 |
| 2005/0174775 A1* | 8/2005 | Conner ................ | G02B 27/148 362/268 |

(Continued)

FOREIGN PATENT DOCUMENTS

EP 2392968 12/2011

OTHER PUBLICATIONS

Extended European Search Report dated Aug. 25, 2020 for European Patent Application No. 20161097.9.

*Primary Examiner* — Gerald J Sufleta, II
(74) *Attorney, Agent, or Firm* — Volpe Koenig

(57) ABSTRACT

A lighting device is described. The lighting device includes at least one first arrangement of light emitting elements and at least one second arrangement of light emitting elements spatially separated from the at least one first arrangement of light emitting elements. The lighting device also includes at least one first magnifying optical element arranged in correspondence with the at least one first arrangement of light emitting elements and at least one second magnifying optical element arranged in correspondence with the at least one second arrangement of light emitting elements. At least one optical projection element is arranged and configured to generate a combined image of a magnified image of the at least one first arrangement of light emitting elements and a magnified image of the at least one second arrangement of light emitting elements.

20 Claims, 7 Drawing Sheets

(56) References Cited

U.S. PATENT DOCUMENTS

| | | | |
|---|---|---|---|
| 2006/0082887 A1* | 4/2006 | Po-Hung | G02B 19/0014 |
| | | | 359/626 |
| 2009/0027589 A1* | 1/2009 | Yamazoe | G02F 1/133603 |
| | | | 349/62 |
| 2011/0116052 A1 | 5/2011 | Kaseya | |
| 2013/0258663 A1* | 10/2013 | Woodgate | F21K 9/64 |
| | | | 362/236 |
| 2018/0156406 A1* | 6/2018 | Feil | F21S 41/24 |
| 2018/0202624 A1 | 7/2018 | De Lamberterie | |
| 2018/0238511 A1* | 8/2018 | Hartmann | F21S 41/153 |
| 2019/0186706 A1* | 6/2019 | Kim | F21S 41/40 |
| 2020/0041084 A1* | 2/2020 | Shyu | F21S 41/675 |
| 2020/0309342 A1* | 10/2020 | Monestier | F21S 41/285 |
| 2021/0018159 A1* | 1/2021 | Vredenborg | F21V 5/008 |
| 2021/0103187 A1* | 4/2021 | Woodgate | G02F 1/133609 |
| 2021/0124247 A1* | 4/2021 | Mezouari | G02F 1/133605 |
| 2021/0135426 A1* | 5/2021 | Miura | H01S 5/02326 |

\* cited by examiner

MICRO-OPTIC FOR MICRO-LED PROJECTION UNIT

CROSS REFERENCE TO RELATED APPLICATION

This application claims the benefit of EP Application 20161097.9, filed Mar. 5, 2020, which is incorporated by reference as if fully set forth.

FIELD OF INVENTION

The present disclosure relates to a lighting device comprising at least first and second arrangements of light emitting elements, in particular micro-LEDs, and optical elements.

BACKGROUND

Lighting devices comprising arrangements of light emitting elements such as matrix light emitting dine (LED) arrangements have become advantageous for projector applications in general and for automotive applications, such as for automotive headlight applications. Automotive applications may include, for example, Adaptive Driving Beam (ADB) applications, Low Beam, High Beam, and Adaptive Front-lighting System applications.

Thereby, micro-LEDs have become advantageous light sources as they may enable placing individual LEDs as pixels at high spatial density and thus may enable projecting images with sharply defined edges and high contrast.

SUMMARY

A lighting device is described. The lighting device includes at least one first arrangement of light emitting elements and at least one second arrangement of light emitting elements spatially separated from the at least one first arrangement of light emitting elements. The lighting device also includes at least one first magnifying optical element arranged in correspondence with the at least one first arrangement of light emitting elements and at least one second magnifying optical element arranged in correspondence with the at least one second arrangement of light emitting elements. At least one optical projection element is arranged and configured to generate a combined image of a magnified image of the at least one first arrangement of light emitting elements and a magnified image of the at least one second arrangement of light emitting elements.

BRIEF DESCRIPTION OF THE DRAWING

A more detailed understanding can be had from the following description, given by way of example in conjunction with the accompanying drawings wherein.

DETAILED DESCRIPTION OF THE PREFERRED EMBODIMENTS

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Figure 1A:
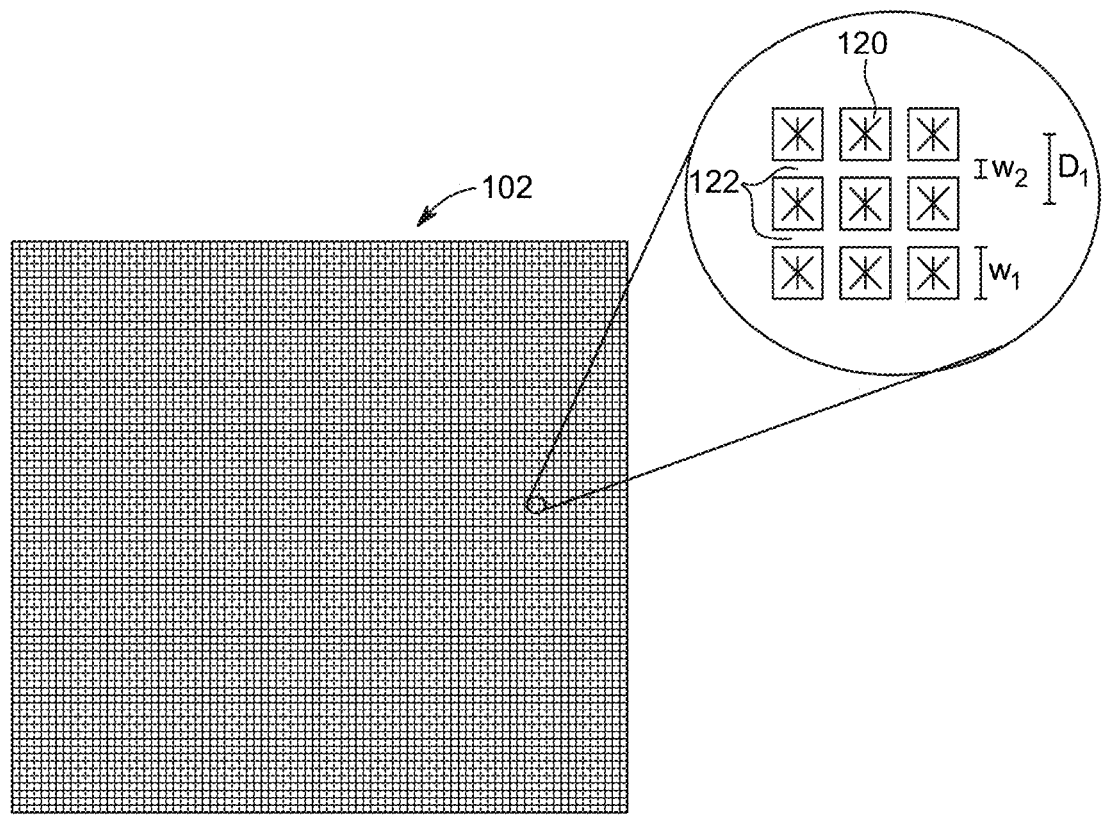
FIG. 1A is a top view of an example LED array.

FIG. 1A is a top view of an example LED array 102. In the example illustrated in FIG. 1A, the LED array 102 is an array of emitters 120. LED arrays may be used for any application, such as those requiring precision control of LED array emitters. Emitters 120 in the LED array 102 may be individually addressable or may be addressable in groups/subsets.

An exploded view of a 3×3 portion of the LED array 102 is also shown in FIG. 1A. As shown in the 3×3 portion exploded view, the LED array 102 may include emitters 120 that each have a width $w_1$. In embodiments, the width $w_1$ may be approximately 100 μm or less (e.g., 40 μm). Lanes 122 between the emitters 120 may be a width, $w_2$, wide. In embodiments, the width $w_2$ may be approximately 20 μm or less (e.g., 5 μm). The lanes 122 may provide an air gap between adjacent emitters or may contain other material. A distance di from the center of one emitter 120 to the center of an adjacent emitter 120 may be approximately 120 µm or less (e.g., 45 µm). It will be understood that the widths and distances provided herein are examples only and that actual widths and/or dimensions may vary.

It will be understood that, although rectangular emitters arranged in a symmetric matrix are shown in FIG. 1A, emitters of any shape and arrangement may be applied to the embodiments described herein. For example, the LED array 102 of FIG. 1A may include over 20,000 emitters in any applicable arrangement, such as a 200×100 matrix, a symmetric matrix, a non-symmetric matrix, or the like. It will also be understood that multiple sets of emitters, matrixes, and/or boards may be arranged in any applicable format to implement the embodiments described herein.

As mentioned above, LED arrays, such as the LED array 102, may include up to 20,000 or more emitters. Such arrays may have a surface area of 90 mm$^2$ or greater and may require significant power to power them, such as 60 watts or more. An LED array such as this may be referred to as a micro LED array or simply a micro LED. A micro LED may include an array of individual emitters provided on a substrate or may be a single silicon wafer or die divided into segments that form the emitters. The latter type of micro LED may be referred to as a monolithic LED.

While arrangements of light emitting elements, such as matrix arrangements of micro-LEDs, have thus become an advantageous choice as light sources for different applications, optical systems for projecting or imaging the light sources onto a given target plane, such as a road surface, may still be improved. Embodiments described herein may provide for an improved light emitting device that may include optical elements that may enable an improvement in quality of an image of arrangements of light emitting elements projected onto a target plane.

Figure 1B:
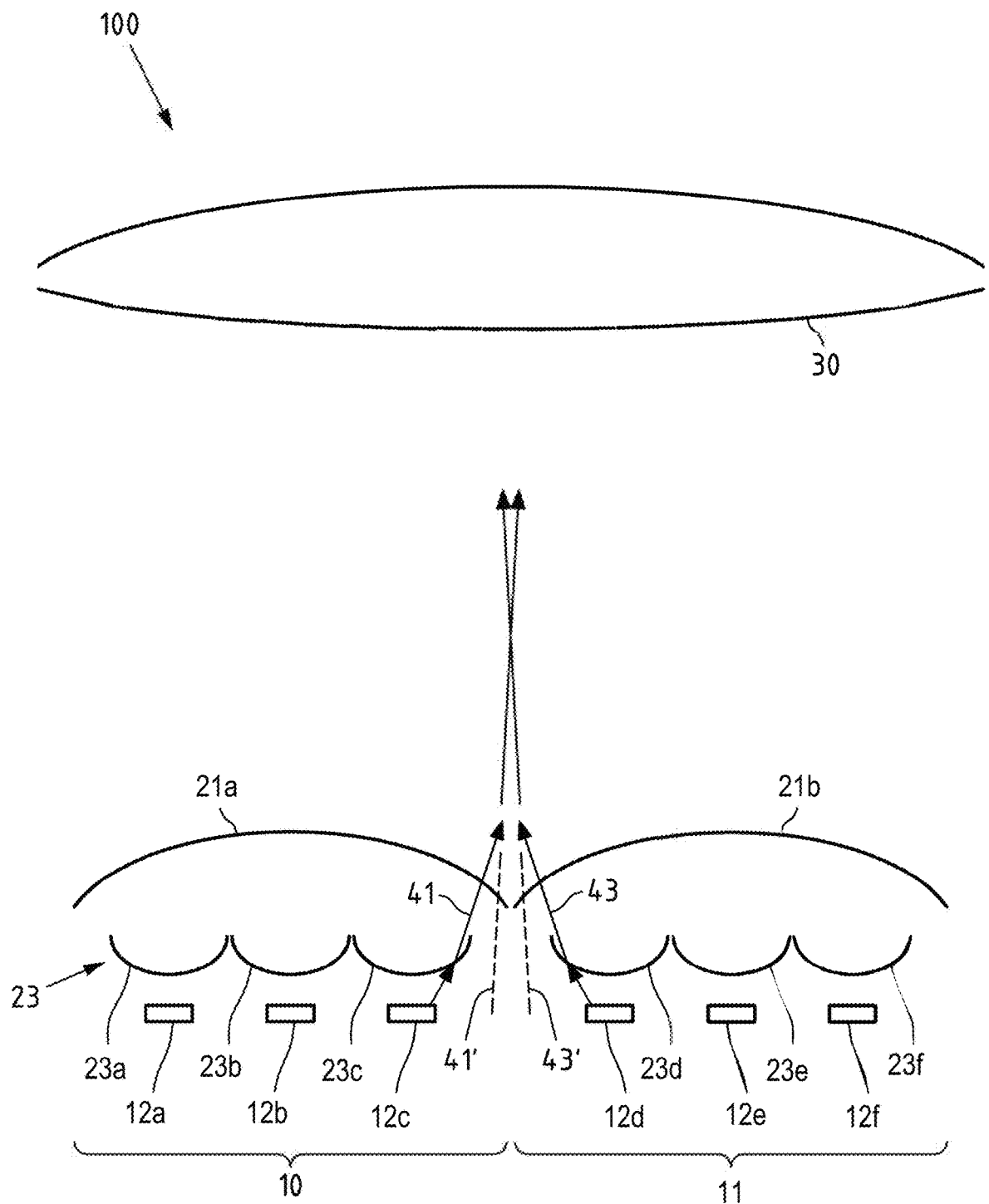
FIG. 1B is a side view of an example lighting device.

FIG. 1B is a schematic illustration of a lighting device 100. In the example illustrated in FIG. 1B, the lighting device 100 includes a first arrangement 10 of LEDs 12a, 12b and 12c and a second arrangement 11 of LEDs 12d, 12e and 12f. It is noted that the cross-sectional view of FIG. 1B only shows a section along LEDs 12a, 12b, 12c, 12d, 12e and 12f that are part of respective matrix arrangements that may include additional LEDs not visible in FIG. 1B as a result of the perspective.

A first arrangement of micro-lenses 23a, 23b and 23c may be arranged in correspondence with the first arrangement 10 of LEDs 12a, 12b and 12c, and a second arrangement of micro-lenses 23d, 23e and 23f may be arranged in correspondence with the second arrangement 11 of LEDs 12d, 12e and 12f. In embodiments, the micro-lenses 23 may be optical collimation elements. Collecting light from each of LEDs 12a, 12b and 12c, a first convex lens 21a may be arranged in correspondence with the first arrangement 10 of LEDs 12a, 12b and 12c. In embodiments, the first convex lens 21a may be a magnifying optical elements that may be arranged for generating a magnified image of the first arrangement 10 of LEDs 12a, 12b and 12c. The magnified image of the first arrangement 10 may be indicated by the dashed portion of arrow 41', which may indicate the direction of light refracted by action of lens 21a as compared to arrow 41, which may indicate the light path without lens 21a. Arrows 43 and 43' illustrate the corresponding action of lens 21b. Lens 30 may be an optical projection element and may be arranged for collecting light emitted from the LEDs 12a, 12b, 12c, 12d, 12e and 12f of arrangements 10 and 11 and, thus, may generate a combined image of the magnified images of the arrangements 10 and 11 generated by lenses 21a and 21b.

Thus, micro-lenses 23a, 23b, 23c, 23d, 23e and 23f may act as pre-collimating optics for pre-collimating light emitted from the LEDs 12a, 12b, 12c, 12d, 12e and 12f of arrangements 10 and 11. Thereby, micro-lenses 23a, 23b, 23c, 23d, 23e and 23f may help to reduce crosstalk between pairs of adjacent LEDs or between groups of LEDs and may further help to increase light output efficiency of lighting device 100.

Magnifying lenses 21a and 21b may be used to magnify the respective arrangements 10 and 11 (i.e. the complete micro-LED chips). As indicated by the dashed portions of arrows 41' and 43', lenses 21a and 21b may help to fill the gap between the arrangements 10 and 11, which may essentially correspond to the distance between LEDs 12c and 12d. In the illustrated example, this distance may correspond to approximately 100 µm, while a gap between pairs of LEDs within each arrangement 10 and 11 may be approximately 20 µm.

Lens 30 may collect the light emitted from all light emitting elements 12a, 12b, 12c, 12d, 12e and 12f and, thus, may image or project images of the arrangements 10 and 11 magnified by lenses 21a and 21b onto a plane, such as a road surface.

In an exemplary embodiment, a light emitting element may correspond to or include a light emitting diode (LED). In particular, in an exemplary embodiment, a light emitting element may correspond to or comprises a micro-LED, such as described above with respect to FIG. 1a or as further described below. In an exemplary embodiment, for a micro-LED, a size (e.g., an edge length or a length of a diagonal of the LED) may be between 10 and 80 µm in some embodiments, between 20 and 60 µm in some embodiments, and between 30 and 50 µm in some embodiments. In this way, individual LEDs may function as individual pixels within the arrangements of light emitting elements. In addition, the small size of such pixels may allow for a high pixel density, which in turn may enable generation of sharp images producible by the lighting device with particular high contrast. The provision of individual arrangements of light emitting elements may also be advantageous in terms of yield, particularly if individual chips corresponding to such arrangement are large (for example, larger than 1-4 mm$^2$). In addition, use of individual arrangements or chips may enable customization of the lighting device in accordance with environments at which the lighting device is to be installed.

In an exemplary embodiment, the light emitting elements of the at least one first arrangement of light emitting elements and/or the at least one second arrangement of light emitting elements may be configured to be individually addressable and/or addressable in groups. In other words, in an exemplary embodiment, the light emitting elements may be individually connectable to a corresponding controller for individually controlling each one of the light emitting elements and/or groups of the light emitting elements. In such embodiment, the lighting device may be employable as or in connection with an automotive headlight as the possibility to individually address/control individual pixels and/or pixel groups may enable controlling a shape of an image generated by the lighting device to adapt such image (e.g., a light distribution projected onto a road) to particular situations (e.g., to driving conditions of a car comprising the lighting device as headlight).

In an exemplary embodiment, one, more or all of the light emitting elements may be configured to emit light of color suitable for an automotive headlight, such as white light. While such embodiment may be particularly advantageous for an automotive headlight application, in an alternative embodiment, one, more or all of the light emitting elements may be configured to emit light of a predefined color (e.g., green and/or blue light). For example, in such embodiment, each of the light emitting elements may comprise a triplet of LEDs, and one LED of the triplet may be configured to emit red light, one LED of the triplet may be configured to emit green light, and one LED of the triplet may be configured to emit blue light. Thereby, in an exemplary embodiment, each LED of the triplet may be configured to be individually controlled (e.g., may be individually connectable to a corresponding controller) such that an image generated by the lighting device may be controlled not only in shape but additionally also in color.

In an exemplary embodiment, the at least one first arrangement of light emitting elements and/or the at least one second arrangement of light emitting elements may correspond to or include a matrix arrangement of the light emitting elements. In a matrix arrangement, light emitting elements may be arranged along respective rows and columns, forming an essentially regular two-dimensional arrangement. In an exemplary embodiment, the at least one first arrangement of light emitting elements and/or the at least one second arrangement of light emitting elements may correspond to or include a micro LED chip.

In an exemplary embodiment, a micro LED chip may correspond to or include at least one array of individually addressable LED junctions arranged on a common substrate. For example, the substrate may correspond to or include a CMOS chip, and a transistor of the CMOS chip may be arranged underneath each LED junction a transistor. In this way, it may be possible to individually control LEDs of the micro LED arrangement by controlling the respective transistors. Further, in an exemplary embodiment, individual micro LEDs or micro LED pixels may be formed using a structured monolithic element. In an exemplary embodiment, a small cavity may be formed around each junction/micro LED to avoid crosstalk between the micro LEDs/pixels.

In an exemplary embodiment, the at least one second arrangement of light emitting elements may be spatially separated from the at least one first arrangement of light emitting elements by a gap. Thereby, the gap may have a width that is larger than a width of a gap separating a first light emitting element of the at least one first arrangement and/or of the at least one second arrangement from a second light emitting element of the at least one first arrangement and/or of the at least one second arrangement arranged adjacent to the first light emitting element. For example, a gap between individual light emitting elements may be on the order of less than a few μm, less than 20 μm, or less than 10 μm. Further, in an exemplary embodiment, a gap between the at least one first arrangement of light emitting elements and the at least one second arrangement of light emitting elements may be between 80 μm and 120 μm, between 90 mm and 110 μm, or about 100 μm. In other words, the lighting device may include arrangements of light emitting elements, such as micro LEDs, which may be arranged at a particularly high density thereby allowing, for example, generation of smooth edges of an image, such as a headlight projected onto a road, the gaps between individual pixels being small as compared to a gap present between individual arrangements (e.g., chips) of light emitting elements.

In an exemplary embodiment, the at least one first magnifying optical element may be arranged in correspondence with the at least one first arrangement of light emitting elements, and a center of the at least one first arrangement of light emitting elements may be aligned with and/or arranged at an optical axis of the at least one first magnifying optical element. Accordingly, in an exemplary embodiment, when the at least one second magnifying optical element is arranged in correspondence with the at least one second arrangement of light emitting elements, a center of the at least one second arrangement of light emitting elements may be aligned with and/or arranged at an optical axis of the at least one second magnifying optical element. By aligning the first and second optical elements with the corresponding arrangements of light emitting elements in this way, image imperfections in corresponding magnified images of the corresponding arrangements of light emitting elements may be minimized.

In an exemplary embodiment, the at least one first magnifying optical element and/or the at least one second magnifying optical element may be or include a lens element, such as an at least partially convex lens element. Thus, the at least one first and/or second magnifying optical element may be configured to magnify an image of the corresponding first and/or second arrangement of light emitting elements. In this way, the at least one first and/or second magnifying optical element may compensate for the gap present between the first and/or second arrangements of light emitting elements. In other words, if, for example, the first and/or second arrangements of light emitting elements would be imaged using a single common projecting element without the first and/or second magnifying optical elements, the gap present between the first and/or second arrangement of light emitting elements may be imaged as well thus potentially causing an undesirable deterioration of an image of the arrangements of light emitting elements. By employing the at least one first and the at least one second magnifying optical elements, this gap can be advantageously compensated for, thus advantageously improving an image of the arrangements of light emitting elements.

In an exemplary embodiment, the at least one optical projection element may correspond to or comprise a single lens or a lens system arranged to collect light emitted from all light emitting elements of the at least one first and the at least one second arrangement of light emitting elements. In this way, the optical projection element may be advantageously configured for generating a combined image of the magnified images of the arrangements of light emitting elements.

In an exemplary embodiment, the lighting device may correspond to or be included in an automotive headlight, and the at least one optical projection element may be arranged and configured for projecting the combined image of the magnified image of the at least one first arrangement of light emitting elements and the magnified image of the at least one second arrangement of light emitting elements onto a predefined plane, such as onto a road. In other words, in an exemplary embodiment, the lighting device may correspond to or be included in an automotive headlight, and a focal distance of the at least one optical projection element may be selected such that the combined image of the magnified image of the at least one first arrangement of light emitting elements and the magnified image of the at least one second arrangement of light emitting elements may be projected onto a road.

In an exemplary embodiment, each optical collimation element may correspond to or include a lens element arranged to collimate light emitted from a corresponding light emitting element. In an exemplary embodiment, each optical collimation element may correspond to or include an at least partially convex lens element. In an exemplary embodiment, the light emitting elements may respectively correspond to micro LEDs, and the at least one first arrangement of optical collimation elements and the at least one second arrangement of optical collimation elements may respectively correspond to respective arrangements of micro-lenses. By providing the optical collimating elements, light emitted from individual light emitting elements may be collimated, which may help to reduce crosstalk between light emitting elements arranged mutually adjacent and thereby may help to enhance contrast between images of individual light emitting elements (e.g., pixels) of respective arrangements.

In an exemplary embodiment, the at least one first magnifying optical element, the at least one second magnifying optical element and the optical collimation elements may be integrally formed. In other words, in an exemplary embodiment, the lighting device may further include an optical member arranged in a path of light emitted from the light emitting elements of the first and the second arrangement of light emitting elements. Thereby, in an exemplary embodiment, the first magnifying optical element and the second magnifying optical element include a face of the optical member facing away from the first and the second arrangement of light emitting elements. Further, in an exemplary embodiment, the at least one first arrangement of optical collimation elements and the at least one second arrangement of optical collimation elements may include a face of the optical member facing the first and the second arrangement of light emitting elements.

In other words, in an exemplary embodiment, the at least one first and second magnifying optical elements and the optical collimation elements may be formed from respective, mutually opposing, faces of the optical member. In this way, a particularly advantageous compact design of the light emitting element may be enabled. Thereby, in an exemplary embodiment, the at least one first magnifying optical element, the at least one second magnifying optical element, one, more or each of the optical collimation elements and/or the optical member may be formed from or include glass or silicone. Using glass may be particularly advantageous in that glass may enable forming corresponding elements of high precision while it may withstand high temperatures and may thus be placed in close vicinity of the arrangements of light emitting elements, which, in an exemplary embodiment, may correspond to high power LEDs to be used for automotive headlight applications. Further, use of silicone may be advantageous in that a less complex production process may be employed for producing the respective component.

Thus, in an exemplary embodiment, respective arrangements of pre-collimating micro-lenses may be aligned with corresponding arrangements of micro-LED pixels. A combination with magnifying lenses aligned with respective arrangements of the micro-LEDs may allow, on the one hand, for compensating for the gap present between respective arrangements of micro-LEDs, and, on the other hand, may contribute to an improved light output efficiency of the overall system. Thereby, the arrangements of pre-collimating micro-lenses facing respective micro-LED pixels may enable an increase in light output efficiency and enable a reduction in crosstalk between respective pixels and/or between pixel groups. The complete assembly may be imaged or projected by the at least one optical projection element (e.g., a single lens or lens system). In an exemplary embodiment, the focus of the at least one optical projection element may be in a plane defined by the at least one first arrangement of light emitting elements and/or by the at least one second arrangement of light emitting elements (e.g., of the µ-LED arrangements). In this way, an advantageous imaging/projecting of the magnified images of the respective arrangements of light emitting elements may be enabled.

In an exemplary embodiment, the lighting system may correspond to or include an automotive headlight system and the controller may correspond to or include control electronics (e.g., of a car) for controlling light emitting elements of the at least one first and of the at least one second arrangements of light emitting elements. In an alternative exemplary embodiment, the lighting system may correspond to or include a light projector system, and the controller may correspond to or include control electronics (e.g., of a projector) for controlling light emitting elements of the at least one first and of the at least one second arrangements of light emitting elements.

Figure 2:
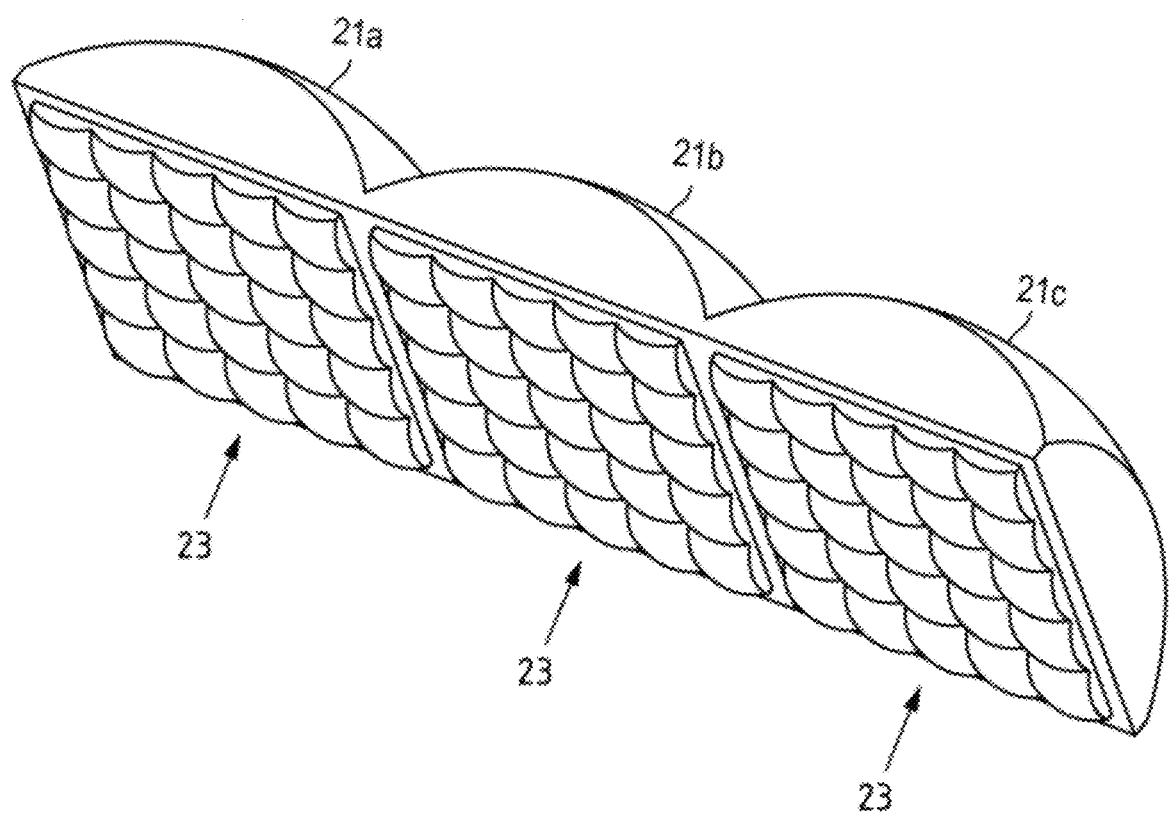
FIG. 2 is a perspective view of example magnifying optical elements and optical collimation elements.

FIG. 2 illustrates three arrangements of micro-lenses 23 and magnifying lenses 21a, 21b and 21c as shown in FIG. 1. As can be taken from FIG. 2, the magnifying lenses 21a, 21b and 21c and the micro-lenses 23 may be integrally formed. In other words, the second magnifying lenses 21a, 21b and 21c may be formed from a face of an optical member while micro-lenses 23 may be formed from an opposing face of the optical member. As mentioned above, in particular where lighting device 100 is used as light source for an automotive headlight where LEDs 12a, 12b, 12c, 12d, 12e and 12f correspond to high power white light LEDs, forming the optical member from a glass material may be advantageous in terms of a corresponding capability to withstand heat generated by the LEDs, and the corresponding optical arrangements may be placed in close proximity to the LEDs.

Figure 3A:
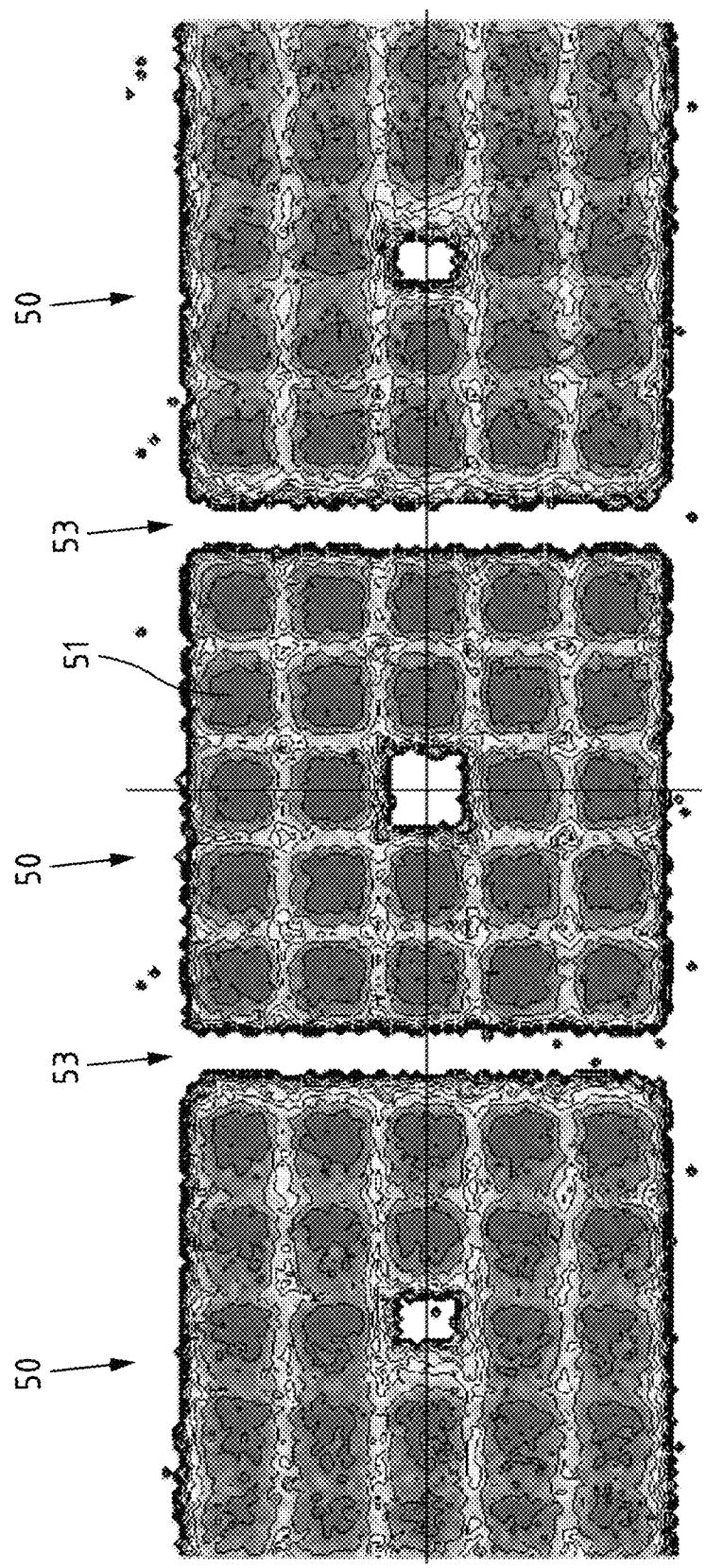
FIG. 3A illustrates an example result of a numerical simulation of a light distribution emitted from a lighting device.

FIG. 3A illustrates a result of a numerical simulation of a light distribution emitted from a lighting device not employing any magnifying lens corresponding to magnifying lenses 21a and 21b of FIG. 1. The shown light distribution includes three images 50, including images 51 (only 1 labeled in the central image 50 of FIG. 3A) of LEDs of respective 6×6 matrix arrangements of LEDs. The light distribution of FIG. 3A is obtained by simulating the effect of pre-collimating lenses corresponding to lenses 23a, 23b, 23c, 23d, 23e and 23f of FIG. 1 and arranged in correspondence with each LED of each one of the 6×6 arrangement of LEDs and of a projection lens corresponding to lens 30 of FIG. 1 arranged for collecting the light from each of the three 6×6 matrix arrangements of LEDs. As can be taken from FIG. 3A, gaps present between the respective 6×6 matrix arrangements of LEDs may be imaged as gaps 53 in the light distribution of FIG. 3A, undesirably interrupting and thereby deteriorating the resulting light distribution (e.g., the projected image of the respective LED matrix arrangements).

Figure 3B:
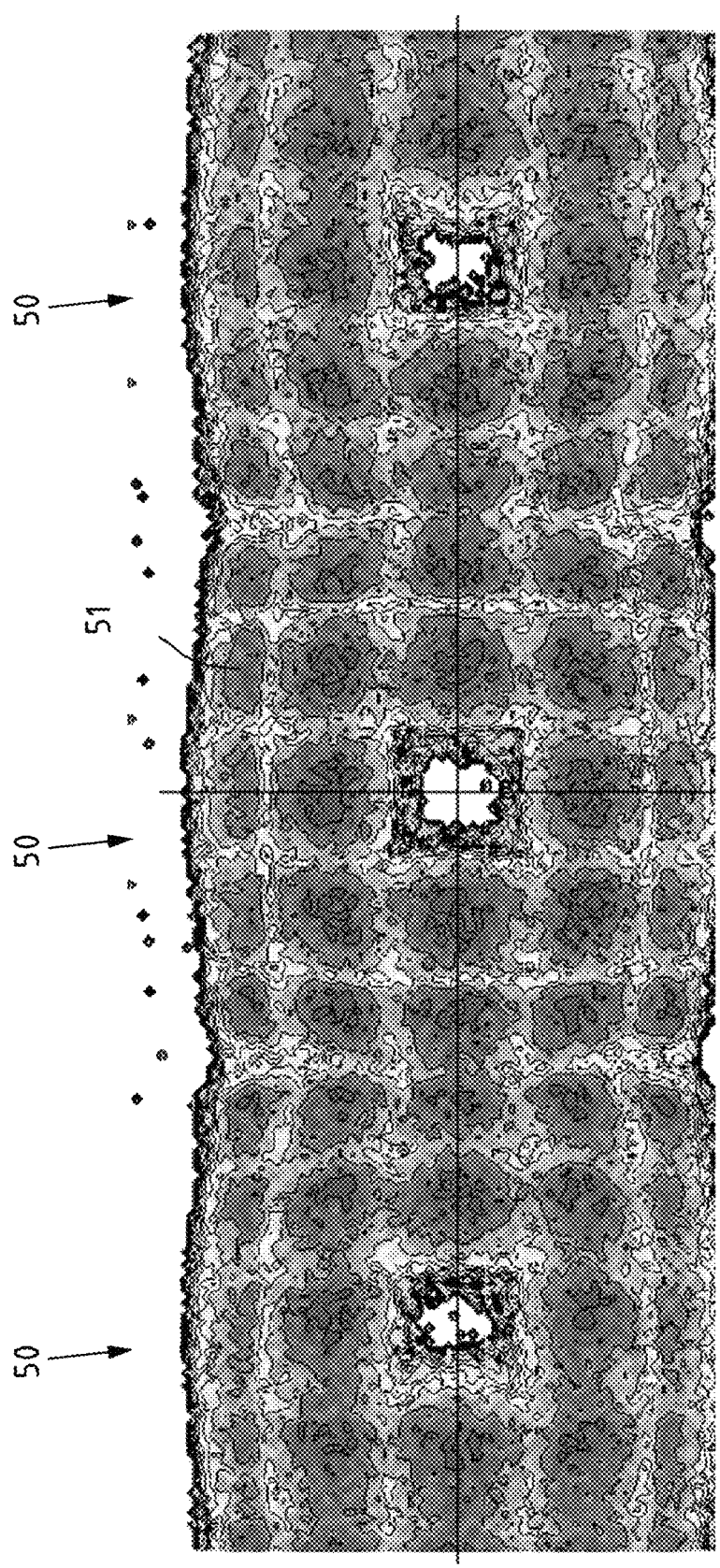
FIG. 3B illustrates an example result of a numerical simulation of a light distribution emitted from a lighting device such as illustrated in FIG. 1B.

FIG. 3B illustrates a result of a numerical simulation of a light distribution emitted from a lighting device further employing magnifying lenses corresponding to magnifying lenses 21a and 21b of FIG. 1. Again, the shown light distribution includes three images 50, including images 51 (only 1 labeled in the central image 50 of FIG. 3B) of LEDs of respective 6×6 matrix arrangements of LEDs. However, as opposed to the case of FIG. 3A, as a result of the magnifying lenses (the magnifying optical elements), a gap present between the respective 6×6 matrix arrangements of LEDs may not be imaged such that the deteriorating interruption of the light distribution shown in FIG. 3A is no longer present in the light distribution shown in FIG. 3B.

It is noted that a central light emitting element of each 6×6 matrix arrangement of LEDs imaged in FIGS. 3A and 3B is turned off, thus illustrating the capability to individually address and control individual LEDs.

Figure 4:
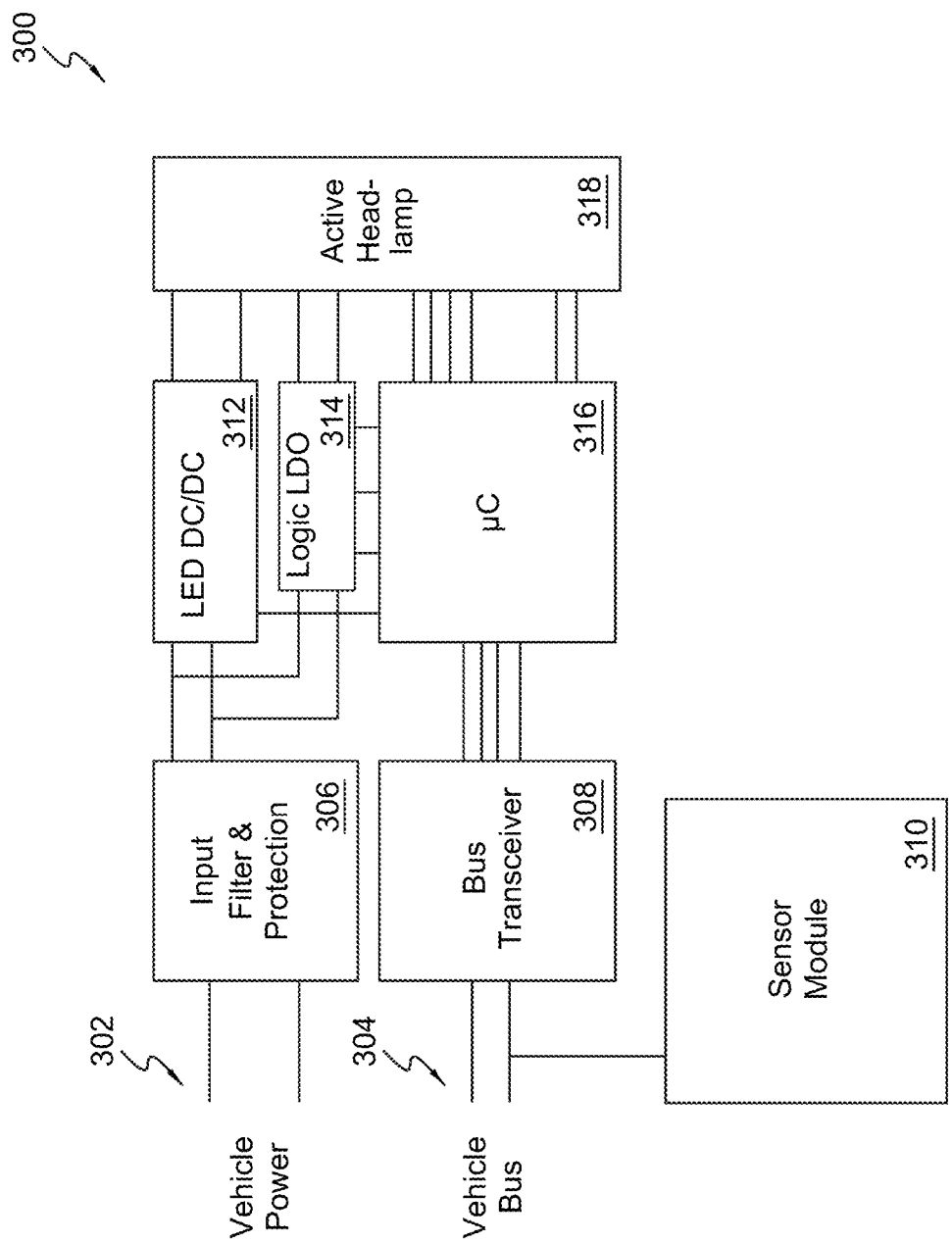
FIG. 4 is a diagram of an example vehicle headlamp system that incorporates the lighting device of FIG. 1B.

FIG. 4 is a diagram of an example vehicle headlamp system 300 that may incorporate the lighting device 100 of FIG. 1B. The example vehicle headlamp system 300 illustrated in FIG. 3 includes power lines 302, a data bus 304, an input filter and protection module 306, a bus transceiver 308, a sensor module 310, an LED direct current to direct current (DC/DC) module 312, a logic low-dropout (LDO) module 314, a micro-controller 316 and an active head lamp 318. In embodiments, the active head lamp 318 may include a lighting device, such as the lighting device 100 of FIG. 1B.

The power lines 302 may have inputs that receive power from a vehicle, and the data bus 304 may have inputs/outputs over which data may be exchanged between the vehicle and the vehicle headlamp system 300. For example, the vehicle headlamp system 300 may receive instructions from other locations in the vehicle, such as instructions to turn on turn signaling or turn on headlamps, and may send feedback to other locations in the vehicle if desired. The sensor module 310 may be communicatively coupled to the data bus 304 and may provide additional data to the vehicle headlamp system 300 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 300. In FIG. 4, the headlamp controller may be a micro-controller, such as micro-controller (μc) 316. The micro-controller 316 may be communicatively coupled to the data bus 304.

The input filter and protection module 306 may be electrically coupled to the power lines 302 and may, for example, support various filters to reduce conducted emissions and provide power immunity. Additionally, the input filter and protection module 306 may provide electrostatic discharge (ESD) protection, load-dump protection, alternator field decay protection, and/or reverse polarity protection.

The LED DC/DC module 312 may be coupled between the filter and protection module 306 and the active headlamp 318 to receive filtered power and provide a drive current to power LEDs in the LED array in the active headlamp 318. The LED DC/DC module 312 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 314 may be coupled to the input filter and protection module 306 to receive the filtered power. The logic LDO module 314 may also be coupled to the micro-controller 314 and the active headlamp 318 to provide power to the micro-controller 314 and/or the silicon backplane (e.g., CMOS logic) in the active headlamp 318.

The bus transceiver 308 may have, for example, a universal asynchronous receiver transmitter (UART) or serial peripheral interface (SPI) interface and may be coupled to the micro-controller 316. The micro-controller 316 may translate vehicle input based on, or including, data from the sensor module 310. The translated vehicle input may include a video signal that is transferrable to an image buffer in the active headlamp module 318. In addition, the micro-controller 316 may load default image frames and test for open/short pixels during startup. In embodiments, an SPI interface may load an image buffer in CMOS. Image frames may be full frame, differential or partial frames. Other features of micro-controller 316 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 5:
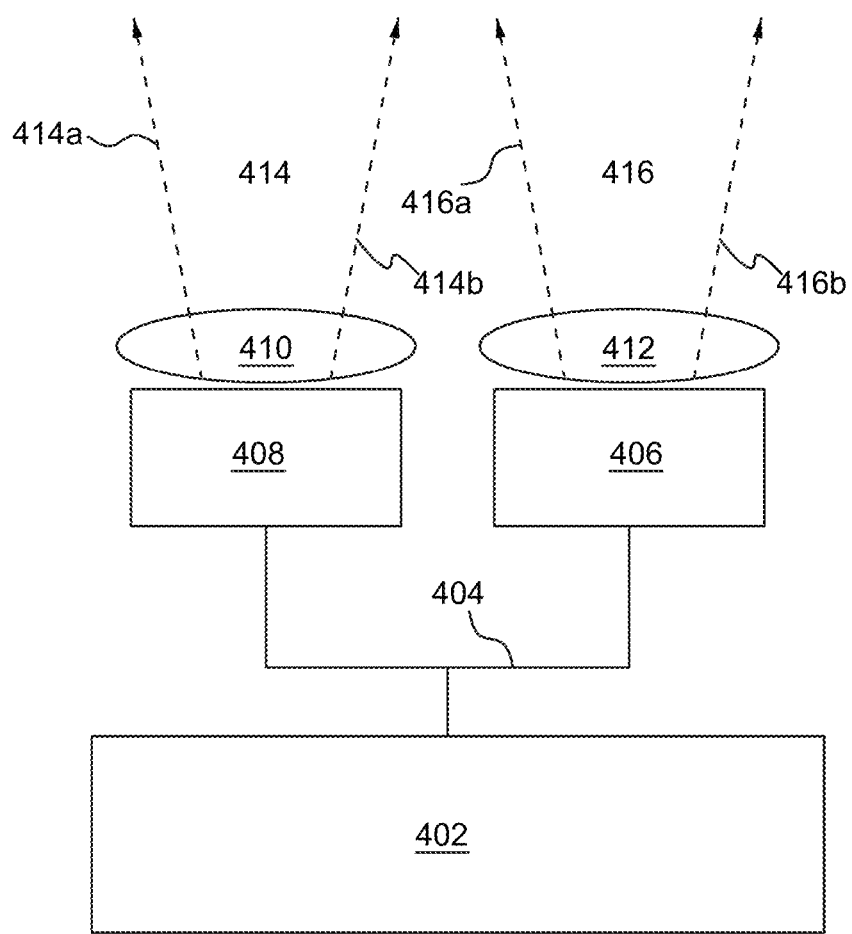
FIG. 5 is a diagram of another example vehicle headlamp system.

FIG. 5 is a diagram of another example vehicle headlamp system 400. The example vehicle headlamp system 400 illustrated in FIG. 5 includes an application platform 402, two lighting devices 406 and 408, and optics 410 and 412. The two lighting devices 406 and 408 may be lighting devices, such as the lighting device 100 of FIG. 1B, or may include the lighting device 100 plus some of all of the other modules in the vehicle headlamp system 300 of FIG. 4. In the latter embodiment, the lighting devices 406 and 408 may be vehicle headlamp sub-systems.

The lighting device 408 may emit light beams 414 (shown between arrows 414a and 414b in FIG. 4). The lighting device 406 may emit light beams 416 (shown between arrows 416a and 416b in FIG. 4). In the embodiment shown in FIG. 4, a secondary optic 410 is adjacent the lighting device 408, and the light emitted from the lighting device 408 passes through the secondary optic 410. Similarly, a secondary optic 412 is adjacent the lighting device 412, and the light emitted from the lighting device 412 passes through the secondary optic 412. In alternative embodiments, no secondary optics 410/412 are provided in the vehicle headlamp system.

The application platform 402 may provide power and/or data to the lighting devices 406 and/or 408 via lines 404, which may include one or more or a portion of the power lines 302 and the data bus 304 of FIG. 4. One or more sensors (which may be the sensors in the system 300 or other additional sensors) may be internal or external to the housing of the application platform 402. Alternatively or in addition, as shown in the example lighting device 300 of FIG. 4, each lighting device 408 and 406 may include its own sensor module, connectivity and control module, power module, and/or LED array.

In embodiments, the vehicle headlamp system 400 may represent an automobile with steerable light beams where LEDs may be selectively activated to provide steerable light. For example, an array of LEDs (e.g., the LED array 102) may be used to define or project a shape or pattern or illuminate only selected sections of a roadway. In an example embodiment, infrared cameras or detector pixels within lighting devices 406 and 408 may be sensors (e.g., similar to sensors in the sensor module 310 of FIG. 4) that identify portions of a scene (e.g., roadway or pedestrian crossing) that require illumination.

What is claimed is:
1. A lighting device comprising:
   at least one first arrangement of light emitting elements;
   at least one second arrangement of light emitting elements spatially separated from the at least one first arrangement of light emitting elements;

a first magnifying lens directly opposite a plurality of the light emitting elements of the at least one first arrangement;

a second magnifying lens directly opposite a plurality of the light emitting elements of the at least one second arrangement; and at least one optical projection element arranged and configured to generate a combined image of a magnified image of the at least one first arrangement of light emitting elements and a magnified image of the at least one second arrangement of light emitting elements.

2. The lighting device of claim 1, wherein the at least one first magnifying optical element is arranged and configured to generate the magnified image of the at least one first arrangement of light emitting elements, and wherein the at least one second magnifying optical element is arranged and configured to generate a magnified image of the at least one second arrangement of light emitting elements.

3. The lighting device according to claim 1, further comprising:

at least one first arrangement of optical collimation elements, each of the optical collimation elements of the at least one first arrangement of optical collimation elements is arranged in correspondence with a corresponding one of the light emitting elements of the at least one first arrangement of light emitting elements; and at least one second arrangement of optical collimation elements, wherein each of the optical collimation elements of the at least one second arrangement of optical collimation elements is arranged in correspondence with a corresponding one of the light emitting elements of the at least one second arrangement of light emitting elements.

4. The lighting device according to claim 3, wherein each of the optical collimation elements of the at least one first arrangement of optical collimation elements and the at least one second arrangement of optical collimation elements comprises a lens element arranged to collimate light emitted from the corresponding one of the light emitting elements.

5. The lighting device according to claim 3, wherein the at least one first magnifying optical element, the at least one second magnifying optical element and the optical collimation elements of the at least one first arrangement of optical collimation elements and the at one second arrangement of optical collimation elements are integrally formed.

6. The lighting device according to claim 3, further comprising an optical member arranged in a path of light emitted from light emitting elements of the first and the second arrangement of light emitting elements, the first magnifying optical element and the second magnifying optical element forming a face of the optical member facing away from the first and the second arrangement of light emitting elements, and the at least one first arrangement of optical collimation elements and the at least one second arrangement of optical collimation elements forming a face of the optical member facing the first and the second arrangement of light emitting elements.

7. The lighting device according to claim 3, wherein the light emitting elements respectively correspond to micro-LEDs, and wherein the at least one first arrangement of optical collimation elements and the at least one second arrangement of optical collimation elements respectively correspond to respective arrangements of micro-lenses.

8. The lighting device according to claim 5, wherein at least one of the at least one first magnifying optical element, the at least one second magnifying optical element, at least one of the optical collimation elements, or the optical member comprises glass or silicone.

9. The lighting device according to claim 1, wherein the at least one second arrangement of light emitting elements is spatially separated from the at least one first arrangement of light emitting elements by a gap having a width that is larger than a width of a gap separating adjacent light emitting elements of the at least one first arrangement.

10. The lighting device according to claim 1, wherein the at least one second arrangement of light emitting elements is spatially separated from the at least one first arrangement of light emitting elements by a gap having a width that is larger than a width of a gap separating adjacent lighting elements of the at least one second arrangement.

11. The lighting device according to claim 1, wherein the light emitting elements of at least one of the at least one first arrangement of light emitting elements or the at least one second arrangement of light emitting elements are configured to be at least one of individually addressable or addressable in groups.

12. The lighting device according to claim 1, wherein at least one of the at least one first arrangement of light emitting elements or the at least one second arrangement of light emitting elements is a matrix arrangement of the light emitting elements.

13. The lighting device according to claim 1, wherein a focus of the at least one optical projection element is in a plane defined by at least one of the at least one first arrangement of light emitting elements or the at least one second arrangement of light emitting elements.

14. The lighting device according to claim 1, wherein the at least one optical projection element comprises a single lens or a lens system arranged to collect light emitted from all of the light emitting elements of the at least one first and the at least one second arrangement of light emitting elements.

15. The lighting device according to claim 1, wherein the light emitting elements are light emitting diodes (LEDs).

16. A lighting system comprising:

a lighting device comprising:
  at least one first arrangement of light emitting elements,
  at least one second arrangement of light emitting elements spatially separated from the at least one first arrangement of light emitting elements,
  a first magnifying lens directly opposite a plurality of the light emitting elements of the at least one first arrangement,
  a second magnifying lens directly opposite a plurality of the light emitting elements of the at least one second arrangement and
  at least one optical projection element arranged and configured to generate a combined image of a magnified image of the at least one first arrangement of light emitting elements and a magnified image of the at least one second arrangement of light emitting elements; and a controller configured to individually control at least one of the light emitting elements of the at least one first arrangement or the lighting elements of the at least one second arrangement of light emitting elements.

17. The lighting system according to claim 16, wherein the lighting system is an automotive headlight system.

18. The lighting system according to claim 16,
wherein the at least one first magnifying optical element is arranged and configured to generate the magnified image of the at least one first arrangement of light emitting elements, and
wherein the at least one second magnifying optical element is arranged and configured to generate a magnified image of the at least one second arrangement of light emitting elements.

19. The lighting system according to claim 16, wherein the lighting device further comprises:
at least one first arrangement of optical collimation elements, each of the optical collimation elements of the at least one first arrangement of optical collimation elements is arranged in correspondence with a corresponding on of the light emitting elements of the at least one first arrangement of light emitting elements, and
at least one second arrangement of optical collimation elements, wherein each of the optical collimation elements of the at least one second arrangement of optical collimation elements is arranged in correspondence with a corresponding one of the light emitting elements of the at least one second arrangement of light emitting elements.

20. The lighting device according to claim 1, wherein the first magnifying lens and the second magnifying lens are each single convex lenses.

* * * * *